(12) United States Patent
Jang

(10) Patent No.: US 7,699,275 B2
(45) Date of Patent: Apr. 20, 2010

(54) STAND FOR DISPLAY DEVICE

(75) Inventor: Woon Geun Jang, Daegu-si (KR)

(73) Assignee: LG Electronics Inc., Seoul (KR)

( * ) Notice: Subject to any disclaimer, the term of this patent is extended or adjusted under 35 U.S.C. 154(b) by 547 days.

(21) Appl. No.: 11/488,115

(22) Filed: Jul. 18, 2006

(65) Prior Publication Data

US 2007/0194184 A1 Aug. 23, 2007

(30) Foreign Application Priority Data

Feb. 17, 2006 (KR) .................. 10-2006-0015880

(51) Int. Cl.
A47F 5/00 (2006.01)

(52) U.S. Cl. .................. 248/125.7; 248/292.12; 248/274.1

(58) Field of Classification Search .............. 248/131, 248/127, 128, 129, 133, 371, 393, 395, 397, 248/424, 429, 430, 176.1, 176.3, 422, 349.1, 248/220.21, 223.31, 292.12, 297.31, 298.1, 248/917, 919, 922, 183.4, 122.1, 125.7, 125.9; 361/681, 679, 825, 679.23, 679.27, 679.21; 348/825; 349/58

See application file for complete search history.

(56) References Cited

U.S. PATENT DOCUMENTS 6,149,253 A * 11/2000 Talasani .................. 312/7.2
6,189,842 B1 * 2/2001 Gull et al. .................. 248/125.1
6,231,021 B1 * 5/2001 Hong .................. 248/371
6,856,506 B2 * 2/2005 Doherty et al. .............. 361/683
2007/0007401 A1 * 1/2007 Corporation et al. ...... 248/125.7
2008/0100997 A1 * 5/2008 Chen .................. 361/681

FOREIGN PATENT DOCUMENTS

GB          2 384 610 A        7/2003
GB          2 419 454 A        4/2006
GB          2419454  A   *    4/2006
JP          2004-15357 A       1/2004
WO          WO-99/55196 A2    11/1999

* cited by examiner

Primary Examiner—J. Allen Shriver
Assistant Examiner—Todd M. Epps
(74) Attorney, Agent, or Firm—Birch, Stewart, Kolasch & Birch, LLP

(57) ABSTRACT

A stand for a display device is provided. The stand prevents a viewer located at a side of the display from experiencing the problems of a narrow viewing angle by allowing the display device to be pivoted in a wide angle without interference from a wall behind the device. The stand includes a base, a swivel hinge, a fixed unit, a telescopic unit, and a movable unit. The swivel hinge is fixed to the base. The fixed unit is rotatably fixed to the swivel hinge. The telescopic unit includes one member fixed to the fixed unit. The movable unit, to which the other member of the telescopic unit is fixed, is capable of being translated in left and right directions of the base and being rotated.

20 Claims, 13 Drawing Sheets

STAND FOR DISPLAY DEVICE

BACKGROUND OF THE INVENTION

1. Field of the Invention

The present invention relates to a stand for a display device, and more particularly, to a stand for a display device that increases convenience for viewers viewing the display device from a side thereof, by allowing a lateral translation of the display device to increase the pivoting angle of the display.

2. Description of the Related Art

A display device according to the related art is divided into wall and floor mounted displays. The present invention relates mostly to the floor-mounted type of display.

A floor-mounted stand is provided to support a flat screen display device at the bottom thereof, so that the display device may be viewed from the front thereof. Also, a user located to one side of the display can pivot the display device to a side in order to adjust the viewing angle of the display device. For this purpose, the stand usually has a built-in hinge that allows pivoting of the display device to the left and right. The swiveling rotation characteristic of such display devices is a necessary feature for display devices with a narrow viewing angle.

In narrow interior spaces, a display device must often be positioned closely against a wall, so that the degree that it can pivot is restricted.

That is, when the display device is pivoted, the edges thereof come into contact with the wall, so that even when the pivoting angle of the hinge allows for further pivoting, the display device cannot be pivoted further until it is moved a certain distance forward from the wall. Thus, when it is not possible to move the display device forward in its entirety, it cannot be pivoted any further. Accordingly, a user cannot further adjust the viewing angle of the display device, and will not be able to see a clear picture from his/her position to a side of the display device.

SUMMARY OF THE INVENTION

Accordingly, the present invention is directed to a stand for a display device that substantially obviates one or more problems due to limitations and disadvantages of the related art.

An object of the present invention is to provide a stand for a display device that allows maximum use of its pivoting angle to the left and right.

Another object of the present invention is to provide a stand for a display device that is capable of translation movement to the left and right, so that adjusting of the viewing angle of the display device can be increased.

A further object of the present invention is to provide a stand for a display device that allows a user to more conveniently pivot the display device to the left and right.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, there is provided a stand for a display device, including: a base; a swivel hinge fixed to the base; a fixed unit rotatably fixed to the swivel hinge; a telescopic unit including one member fixed to the fixed unit; and a movable unit to which the other member of the telescopic unit is fixed, the movable unit being capable of being translated in left and right directions of the base and being rotated.

In another aspect of the present invention, there is provided a stand for a display device, including: a base to which the display device is fixed; a swivel hinge provided between the base and the display device, for allowing rotation of the display device with respect to the base; and a telescopic unit provided between the base and the display device, for allowing translation of the display device in one direction with respect to the base.

In a further aspect of the present invention, there is provided a stand for a display device, including: a base; a swivel hinge having a lower portion fixed to the base; a fixed plate fixed to an upper portion of the swivel hinge for rotation; a telescopic unit having one member fixed to an upper portion of the fixed plate; a sliding plate to which the other member of the telescopic unit is fixed and capable of translation with respect to the fixed plate; and a support fixed to an upper portion of the sliding plate for supporting the display device.

The stand for the display device according to the present invention allows the viewing angle of the display device to be adjusted more widely—especially when there is a restriction imposed on the pivoting angle of the display device—to increase a user's convenience.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

First Embodiment

Figure 1:
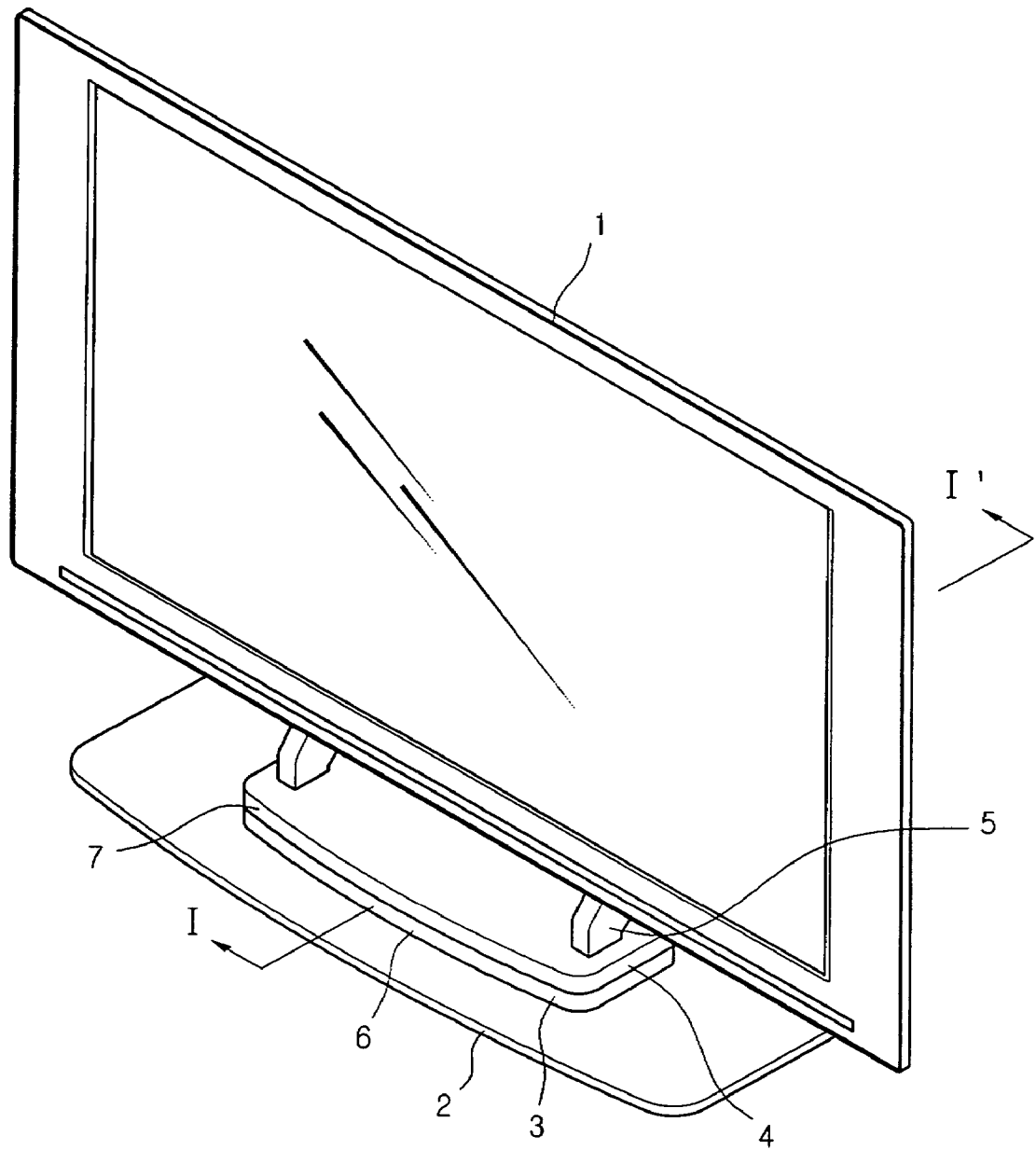
FIG. 1 is a perspective view of a stand for a display device according to the first embodiment of the present invention.

FIG. 1 is a perspective view of a stand for a display device according to the first embodiment of the present invention.

Referring to FIG. 1, a stand for a display device according to the present invention includes a display device 1, a supporting stand 5 supporting the display device 1 at a bottom thereof, a movable unit 4 disposed below the supporting stand 5, a fixed unit 3 disposed below the movable unit 4, and a base 2 for supporting the weight of the display device 1 while preventing it from falling over. An upper housing 7 is provided on the outside of the movable unit 4, and a lower housing 6 is provided on the outside of the fixed unit 3. The housings 6 and 7 form the exteriors of the movable unit 4 and fixed unit 3.

The movable unit 4 and the fixed unit 3 pivot together. However, when the display device 1 is translated laterally, the fixed unit 3 remains fixed, while the movable unit 4 moves laterally. Thus, the fixed unit 3 only pivots, while the movable unit 4 pivots as well as translates laterally. Because the movable unit 4 is capable of lateral translation, the pivotable angle of the display device 1 increases. Therefore, the adjustable range for the viewing angle is broadened.

Below, the inner structure of the moving and fixed portions 4 and 3 will be described in further detail.

Figure 2:
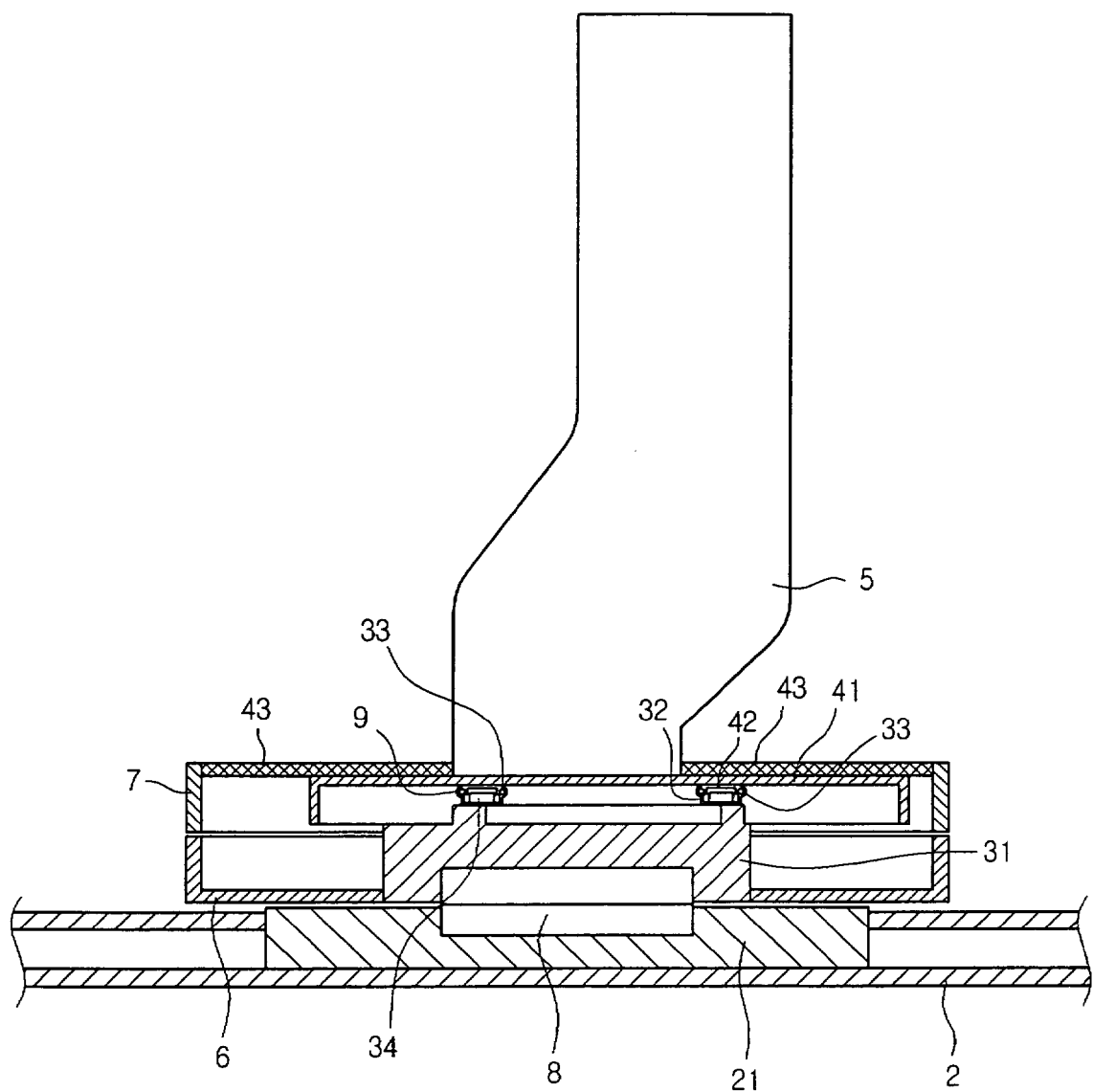
FIG. 2 is a sectional view of the stand in FIG. 1, taken along line I-I'.
Figure 3:
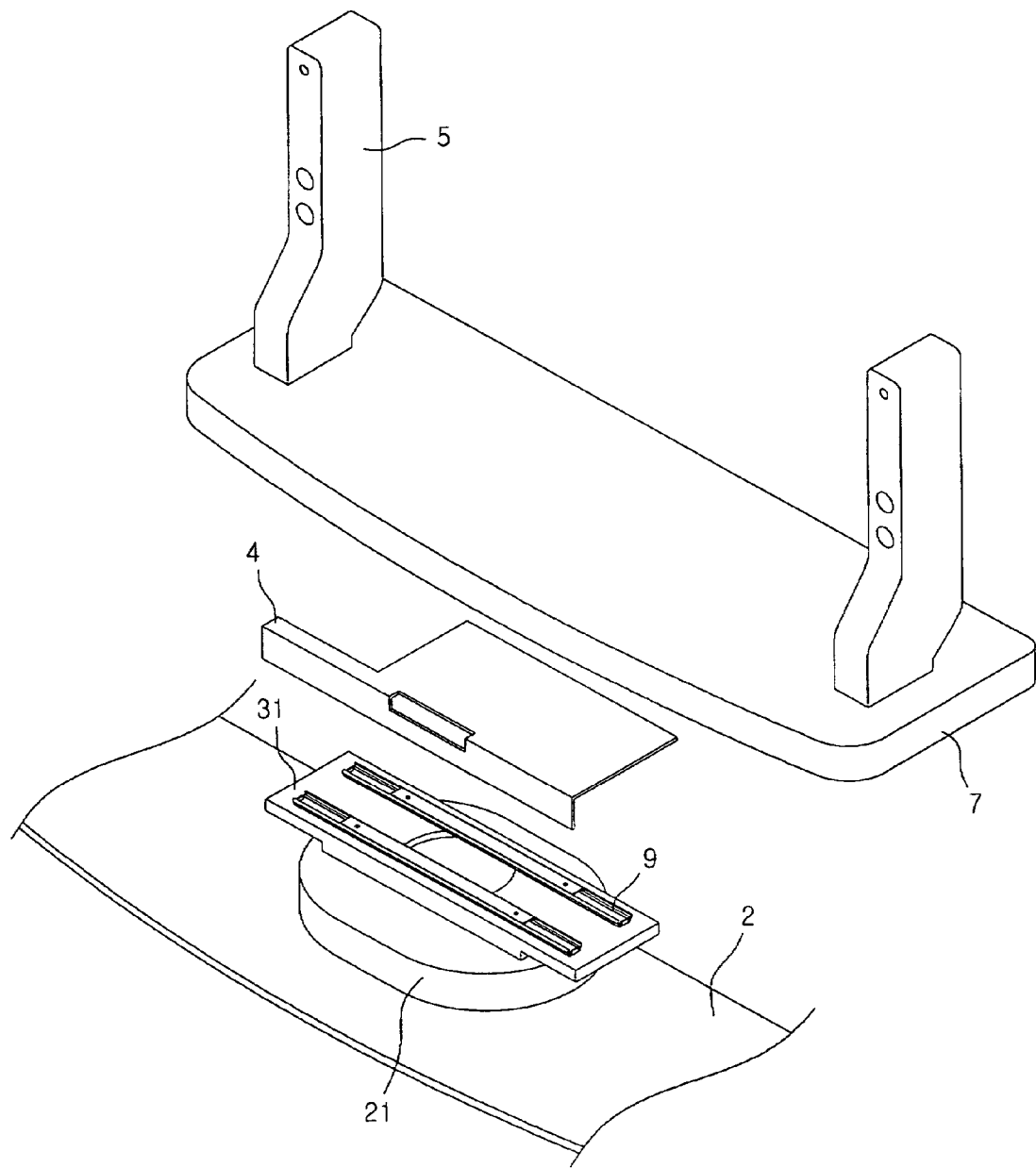
FIG. 3 is an exploded perspective view of a movable unit and a fixed unit according to the present invention.

FIG. 2 is a sectional view of the stand in FIG. 1, taken along line I-I', and FIG. 3 is an exploded perspective view of a movable unit and a fixed unit according to the present invention.

Referring to FIGS. 2 and 3, a stand for a display device according to the present invention includes a base 2 for supporting the screen, a supporting stand 5 fastened to the display device, a movable unit 4 that is an inner component of the upper housing 7 and performs lateral translation and pivoting simultaneously with the supporting stand fixed thereto, and a fixed unit 3 that pivots while fixed to the base 2 and is an inner component of the lower housing 6. Because a mounting unit 21 is provided on top of the base 2, and a swivel hinge 8 is provided on top of the mounting unit 21, the components above the swivel hinge 8 can pivot with respect to the components under the swivel hinge 8.

In further detail, the fixed unit 3 is fixed to the top of the swivel hinge 8, and has a fixed plate 31 that swivels, and the lower housing 6 that covers the fixed plate 31. A telescopic unit 9 is disposed on top of the fixed plate 31. The telescopic unit is retractable device and has bearings interposed for sliding the two components of the telescopic unit against one another.

The telescopic unit 9 includes a lower member 32 fixed to the fixed plate 31, an upper member 42 fixed to a sliding plate 41, a bearing 33 for allowing the upper member 42 and the lower member 32 to slide, and a friction member 34 provided at a contacting portion between the upper and lower members 42 and 32. The friction member 34 prevents the upper and lower members 42 and 32 from sliding along the bearing 33 until a predetermined force is applied. In detail, the lower member 32 of the telescopic unit 9 can be said to be a part of the fixed unit 3, and the upper member 42 can be said to be a connecting component for the moving and fixed units 4 and 3.

The movable unit 4 includes a sliding plate 41 fixed to the top of the upper member 42, a mounting plate 43 fixed to the top of the sliding plate, and an upper housing 7 covering the mounting plate 43.

From the above configured structure, there are dispensable components. For example, the mounting plate 43 may be formed integrally with the sliding plate 41 to eliminate the need for a separate component, and the housings 6 and 7 are not required items as well.

Figure 4:
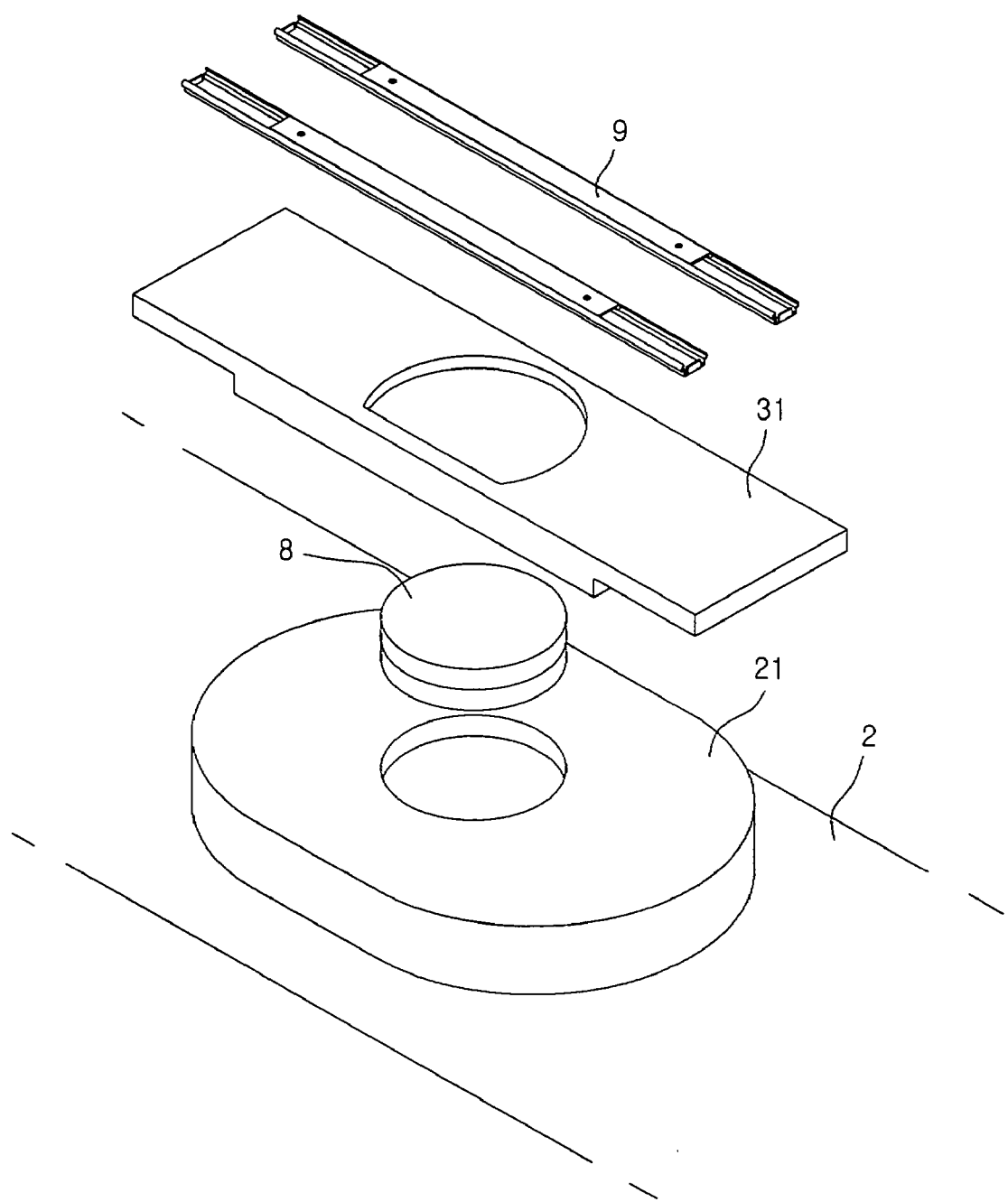
FIG. 4 is an enlarged, exploded perspective view of the lower portion in FIG. 3.

FIG. 4 is an enlarged, exploded perspective view of the lower portion in FIG. 3. Referring to FIG. 4, the connecting structure of the mounting unit 21, swivel hinge 8, fixed plate 31, and telescopic unit 9 may be more clearly understood.

Referring to the above-described structure, the operation of the stand for the display device according to the present invention will now be described in detail.

First, when a user wishes to adjust the viewing angle of the display device, force is applied to pivot the display device to the clockwise or counterclockwise. When the force is applied, the swivel hinge 8 acts as a pivoting point, and the components above the swivel hinge 8 pivot, while the mounting unit 21 and the base 2 remain fixed. Even if the force that the user applies is not in a pivoting direction of the display device, but in a pushing direction of the display device laterally, the friction imparted by the friction member 34 can prevent the telescopic unit 9 from operating and keep it fixed.

Figure 5:
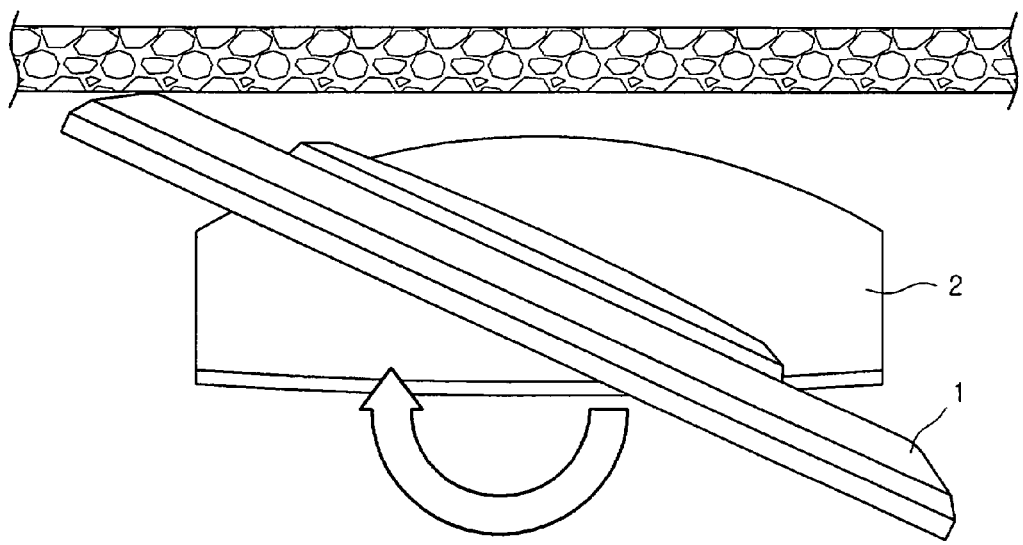
FIG. 5 is a top view showing a pivoted display device.

When the pivoting of the display device 1 exceeds a certain angle, the display device 1 contacts the wall behind it and can no longer pivot. The display device in FIG. 5 illustrates this condition.

Here, the user changes the direction of force applied to cease the pivoting movement of the display device, while applying force pushing the display device to the left or the right. When such a force pushing the display device left or right is increased, the telescopic unit 9, which was previously prevented from moving by the friction provided by the friction member 34, operates. In other words, the upper member 42 slides along the bearing 33 against the lower member 32 in a translation movement. This is shown clearly by the plan view of a display device in FIG. 6.

Figure 6:
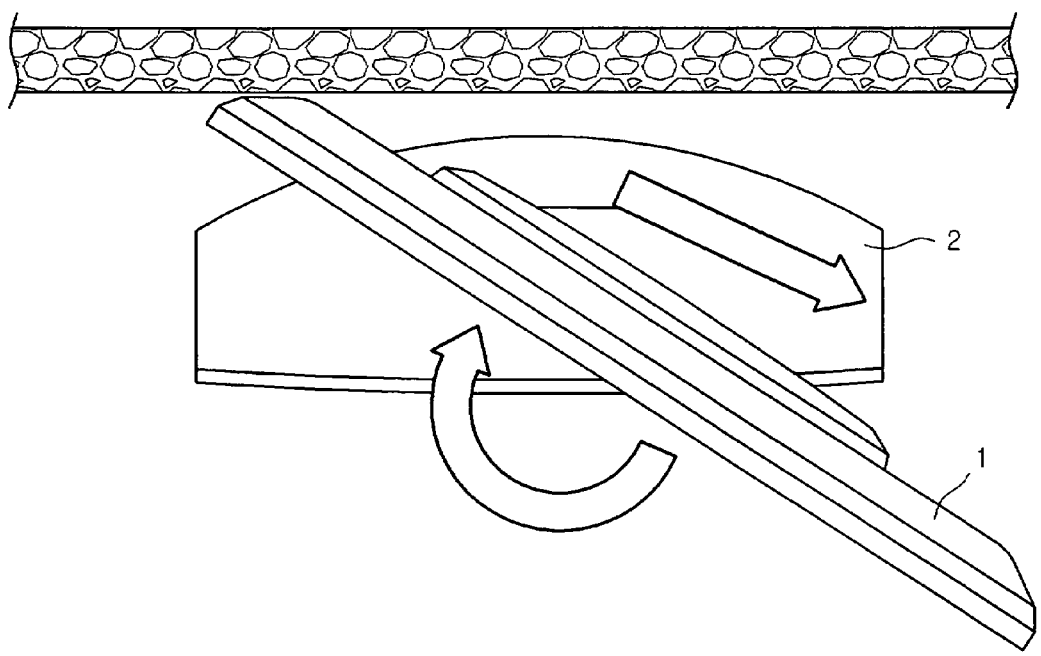
FIG. 6 is a top view showing a pivoted and translated display device.

As seen clearly in FIG. 6, the display device 1 translates laterally by the telescopic unit 9, so that the angle that the display device 1 is able to pivot to the left and right increases. Thus, the display device 1 may be pivoted further in accordance with the increased pivotable angle.

Of course, the range that the display device 1 can be pivoted is limited by the swivel hinge 8. Furthermore, the distance that the display device 1 is able to move by means of the telescopic unit 9 is limited by the telescopic unit 9 itself, so that the display device 1 does not travel a prolonged distance (whereupon its own weight causes it to keel over easily) because it is not properly supported by the base 2.

As shown, when the display device according to the present invention is installed close to a wall, a user located in a direction to one side of the display device can comfortably view the screen by pivoting the display device an adequate amount. In this way, having to move the entire stand to increase the viewing angle of the display device can be avoided.

Second Embodiment

In the first embodiment, the pivoting angle enabling a view to comfortably view the display, can be increased without needs to move the entire display device. However, a user must apply a force for pivoting the display device over a certain duration, and push the display device laterally after bumping the display device on the surface of the wall. In other words, the direction of force applied to the display device must be changed, depending on the situation. Thus, if a user is not familiar with using the stand, the user may not be able to fully exploit its functions.

In order to solve these problems, a second embodiment is proposed.

Figure 7:
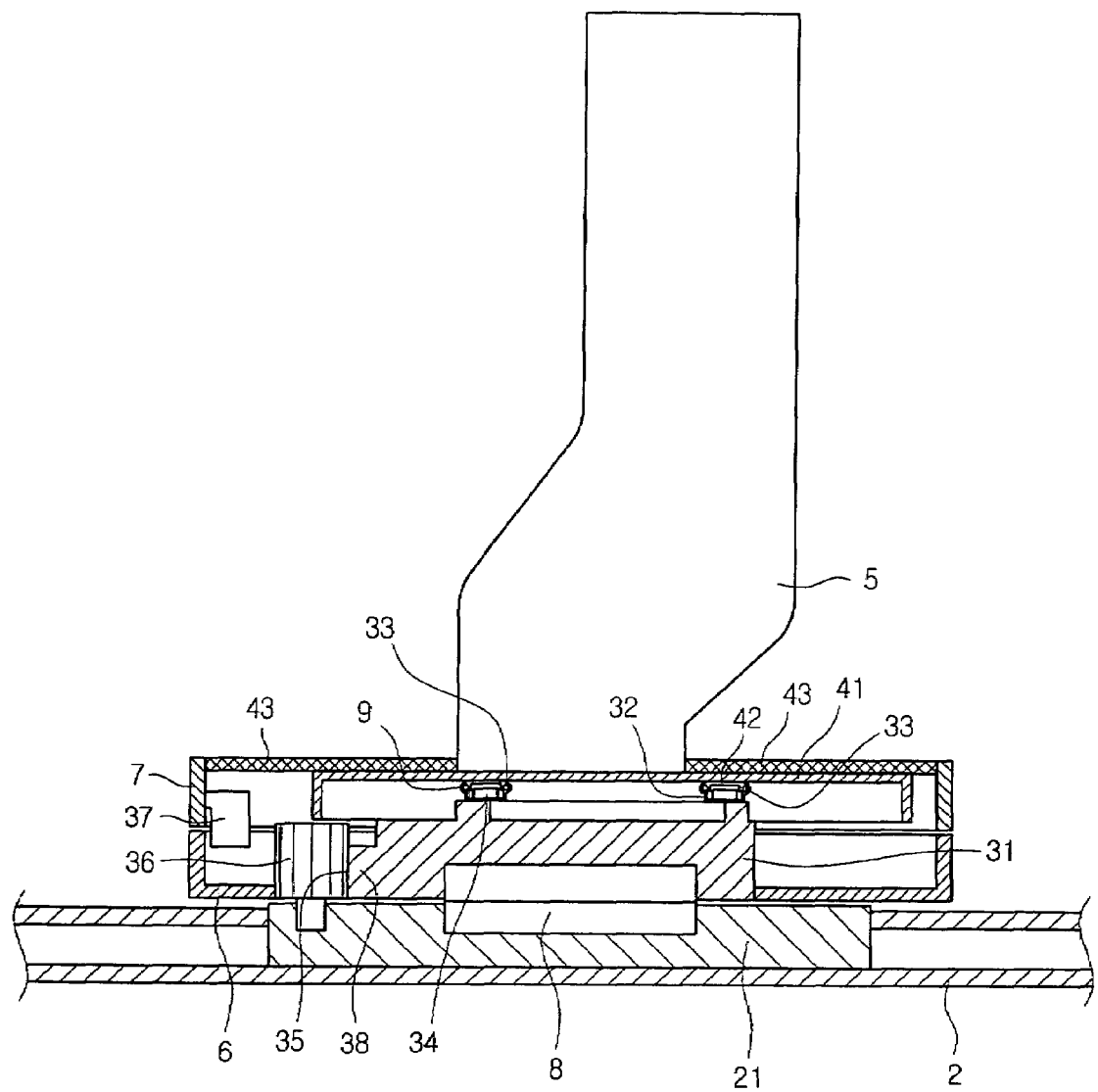
FIG. 7 is a sectional view of a stand according to the second embodiment of the present invention.
Figure 8:
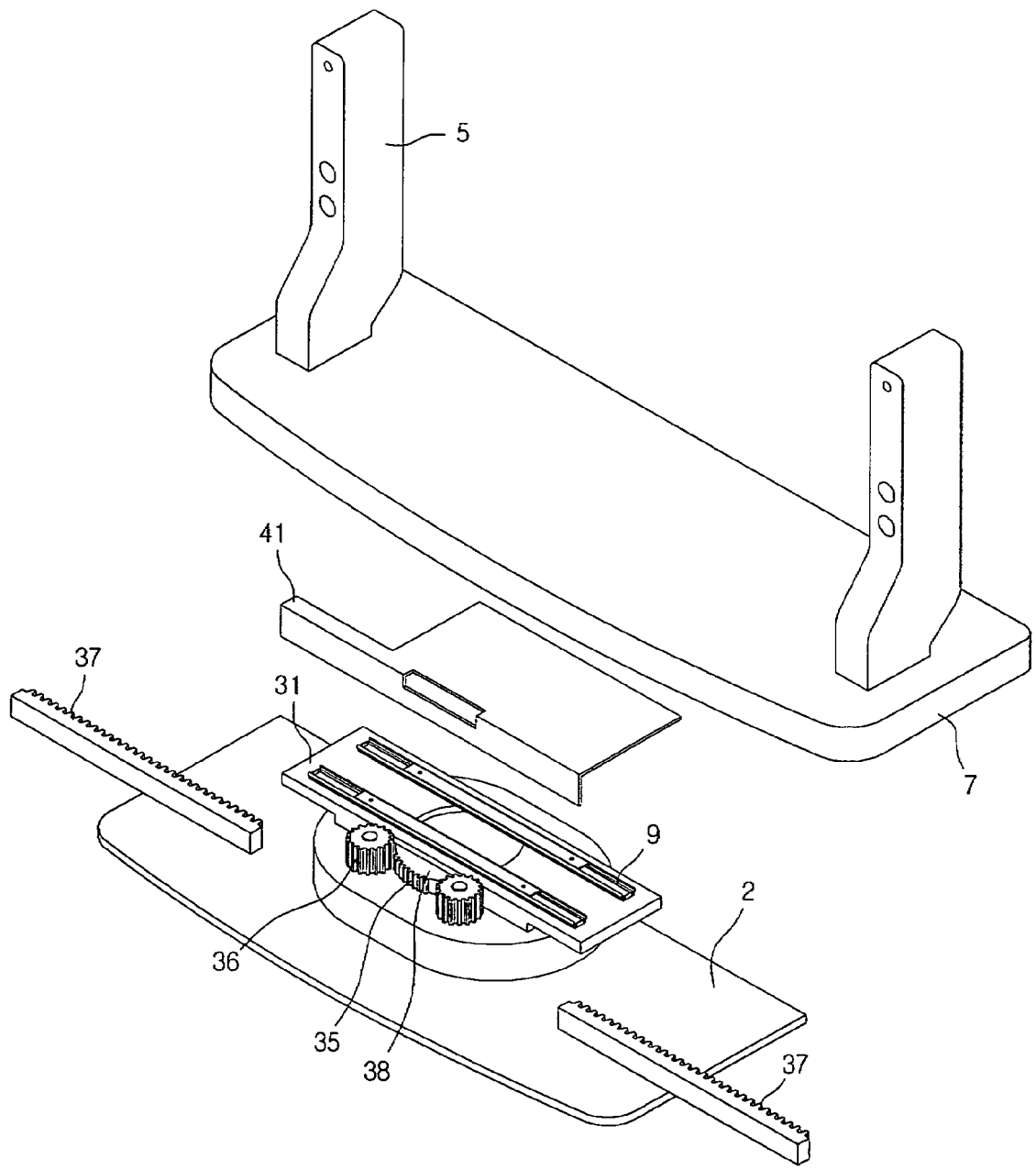
FIG. 8 is an exploded perspective view of a movable unit, fixed unit, and their surrounding structure according to the second embodiment of the present invention.
Figure 9:
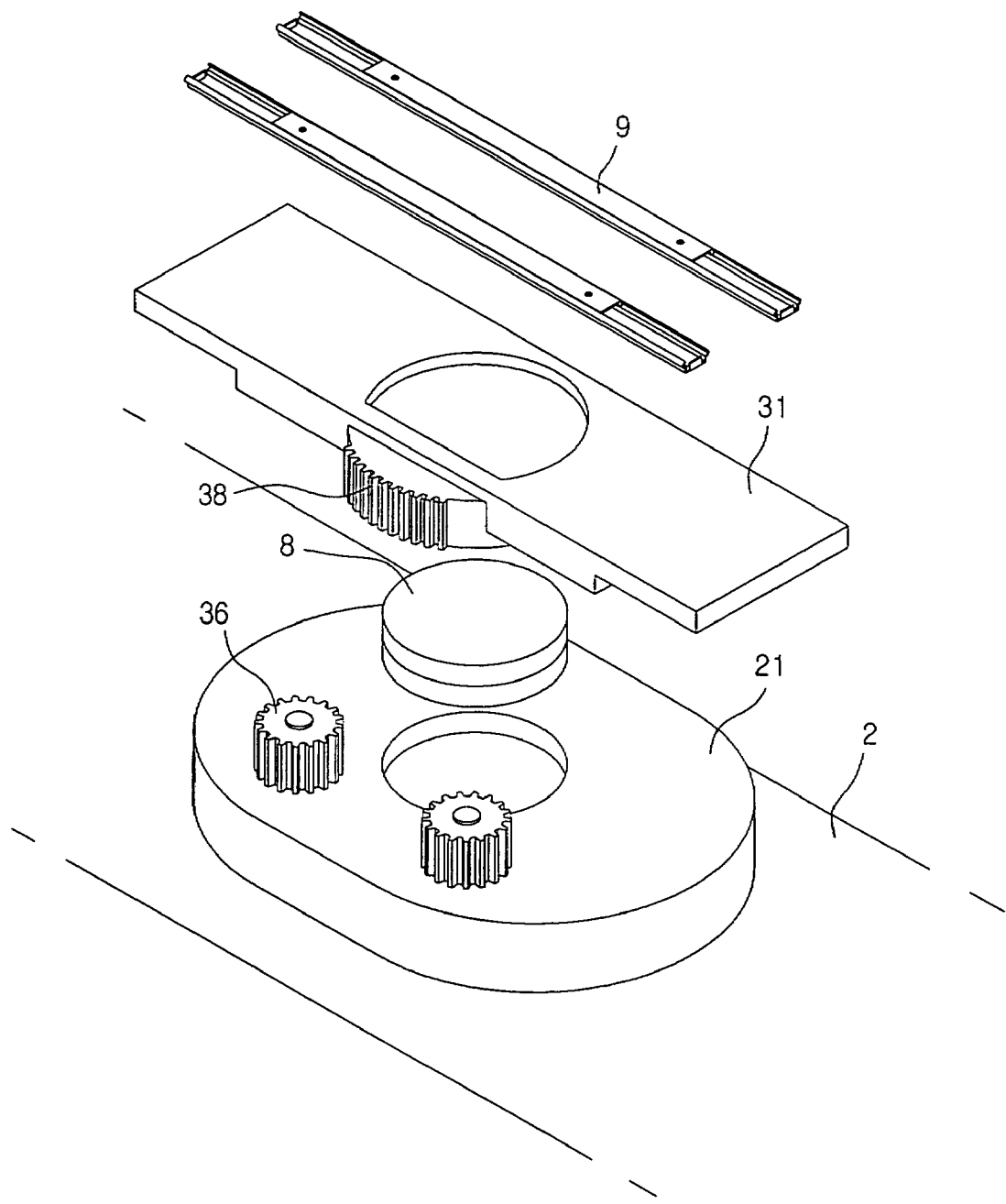
FIG. 9 is an enlarged, exploded perspective view of the lower portion of the stand in FIG. 8.

FIG. 7 is a sectional view of a stand according to the second embodiment of the present invention, FIG. 8 is an exploded perspective view of a movable unit, fixed unit, and their surrounding structure according to the second embodiment of the present invention, and FIG. 9 is an enlarged, exploded perspective view of the lower portion of the stand in FIG. 8. Components that are the same as those in the first embodiment use the same reference numbers and will not be described in detail in the second embodiment, but deemed already addressed by the first embodiment description.

Referring to FIGS. 7 through 9, the fixed plate 31 has a cylindrical protruding portion 38 formed at the front, and a cylindrical gear 35 on the cylindrical protruding portion 38. Pinion gears 36 are formed to protrude upward from the mounting unit 21 around the cylindrical gear 35, and spaced a predetermined distance from each other. Also, a rack 37 is fixed to the inner side of the mounting plate 43. Because the rack 37 is fixed to the mounting plate 43, when the rack 37 moves, so do the mounting plate 43, and resultantly, the movable unit 4 in its entirety moves in a translating movement. Although FIGS. 8 and 9 show the rack 37 as a separate component for the sake of simplifying the diagram, it is in fact, fixed to the inner surface of the mounting plate 43. Of course, it may be fixed to another component of the movable unit 4, and not to the mounting plate 43.

To explain the structure of the above components, the cylindrical gear 35 is cylindrical and symmetrical on at least the left and right sides, and turns together with the fixing plate 31 when the fixing plate 31 rotates. It can thus turn to the left and right at any position. The pinions 36 are installed symmetrically around the cylindrical gear 35 to the left and right thereof, and are separated from the cylindrical gear 35 when the display device 1 has not been pivoted past a certain angle. The rack 37 is fixed on the inside of the mounting plate 43, and is disposed to the left and right of the cylindrical gear 35 apart from each other. When the display device is not pivoted beyond a certain angle, the rack 37 is separated from the pinions 36.

A brief description of the pivoting and translating of the above-structured display device will now be given.

When the display device 1 is pivoted, the fixing plate 31 and the sliding plate 41 pivot together. When the display device 1 is pivoted at a certain angle, the cylindrical gear 35 meshes with the pinions 36, and the rack 37 also meshes with the pinions 36. In this state, when the cylindrical gear 35 is turned further, it turns the pinions 36, which in turn, translate the rack 37. The rack 37 translates the moving unit 4 laterally. Of course, the moving unit 4 and the fixing unit 3 pivot against the base 2 on the swivel hinge 8.

The rotating angle at which the rack 37 and pinions 36 mesh may be the same as the rotating angle at which the cylindrical gear 35 and the pinions 36 mesh. Also, the rotating angle at which the rack 37 and the pinions 36 mesh can be occur earlier than the rotating angle at which the cylindrical gear 35 and the pinions 36 mesh, so that the rack 37 and pinions 36 may rotate idly. Furthermore, the rotating angle at which the rack 37 and the pinions 36 mesh can be occur later than the rotating angle at which the cylindrical gear 35 and the pinions mesh, so that the cylindrical gear 35 and the pinions 36 may rotate idly. However, it is essential that the rack 37, pinions 36, and the cylindrical gear 35 all mesh between at least a certain range of angles, so that rotating of the cylindrical gear 35 prompts the rack 37 to translate.

The rack 37, pinions 36, and cylindrical gear 35 may respectively mesh when the display device pivots to at least the rear portion of the base 2, which is the point where the display device contacts the wall behind it.

Figure 10:
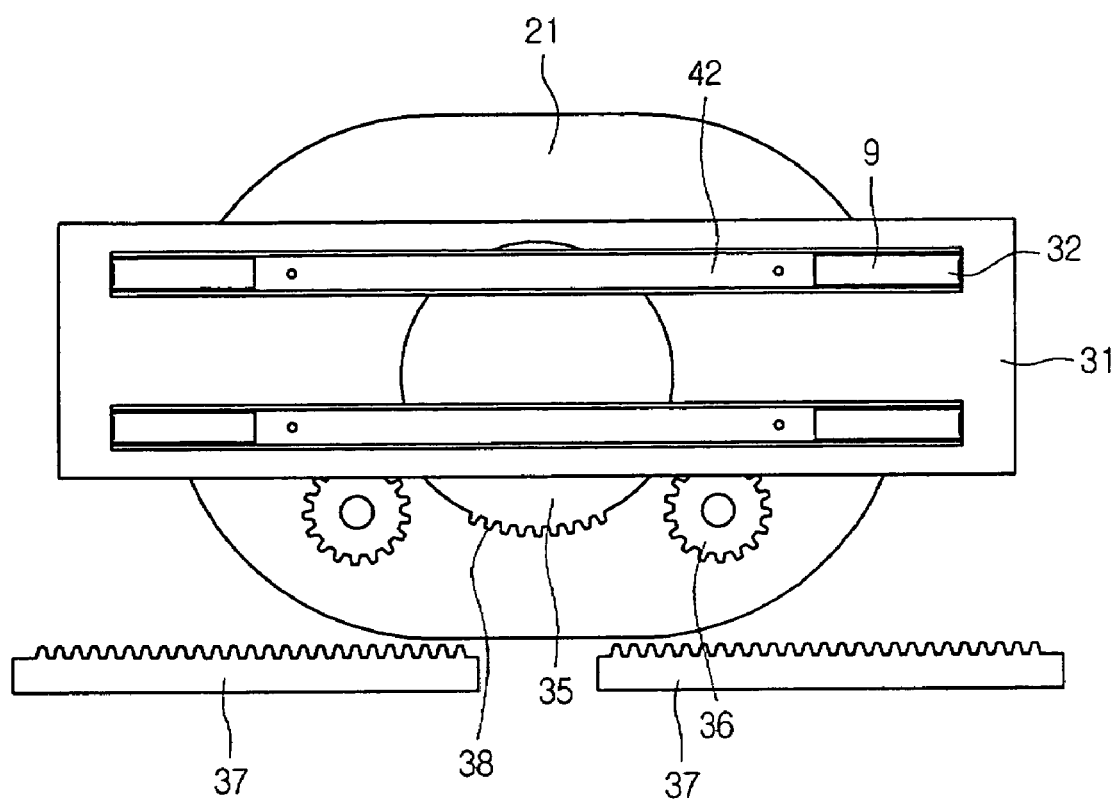
FIG. 10 is a plan view showing a display device that has not been pivoted, according to the second embodiment of the present invention.
Figure 11:
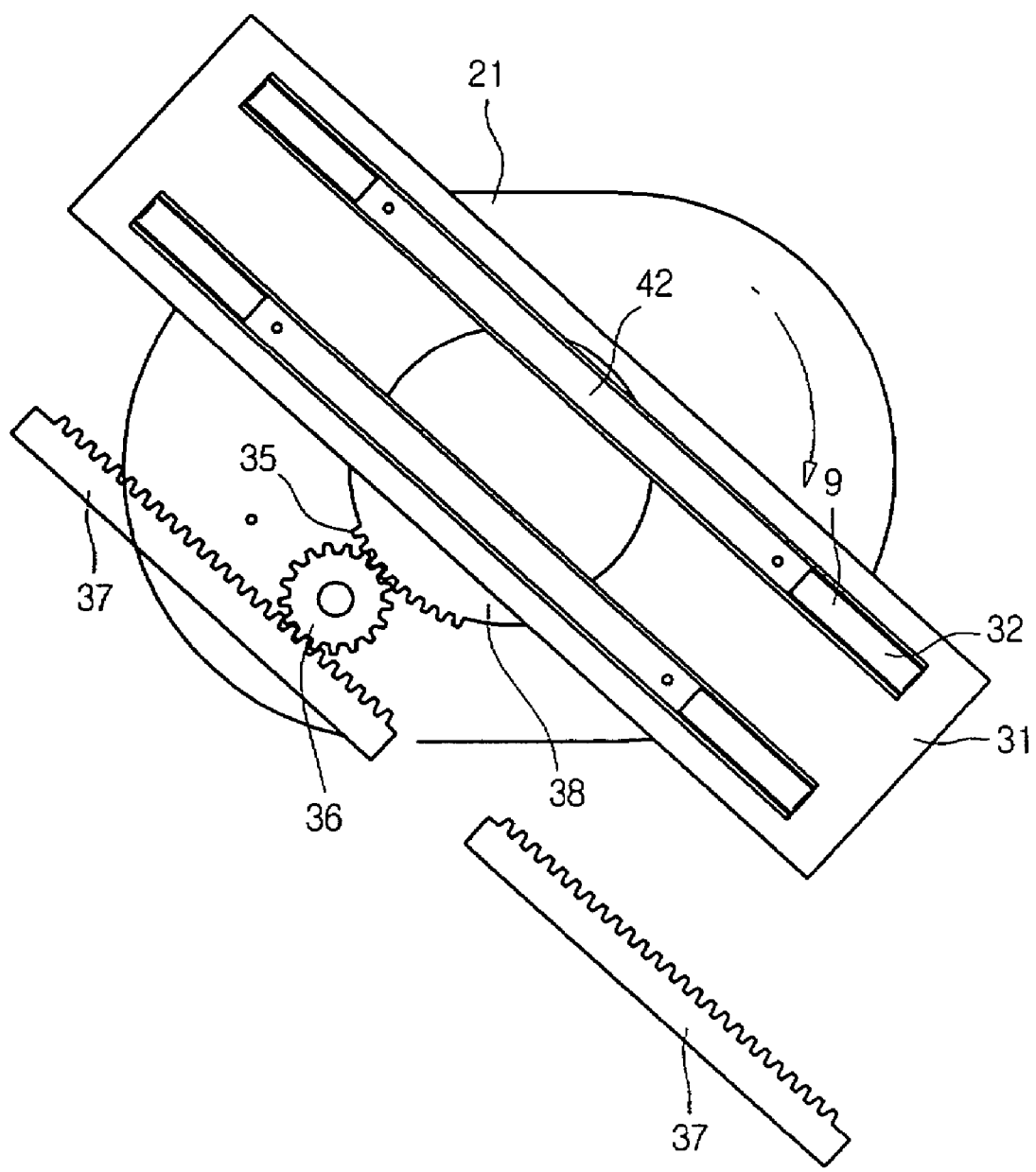
FIG. 11 is a plan view showing a display device that has been pivoted and in a position beginning lateral translation, according to the second embodiment of the present invention.
Figure 12:
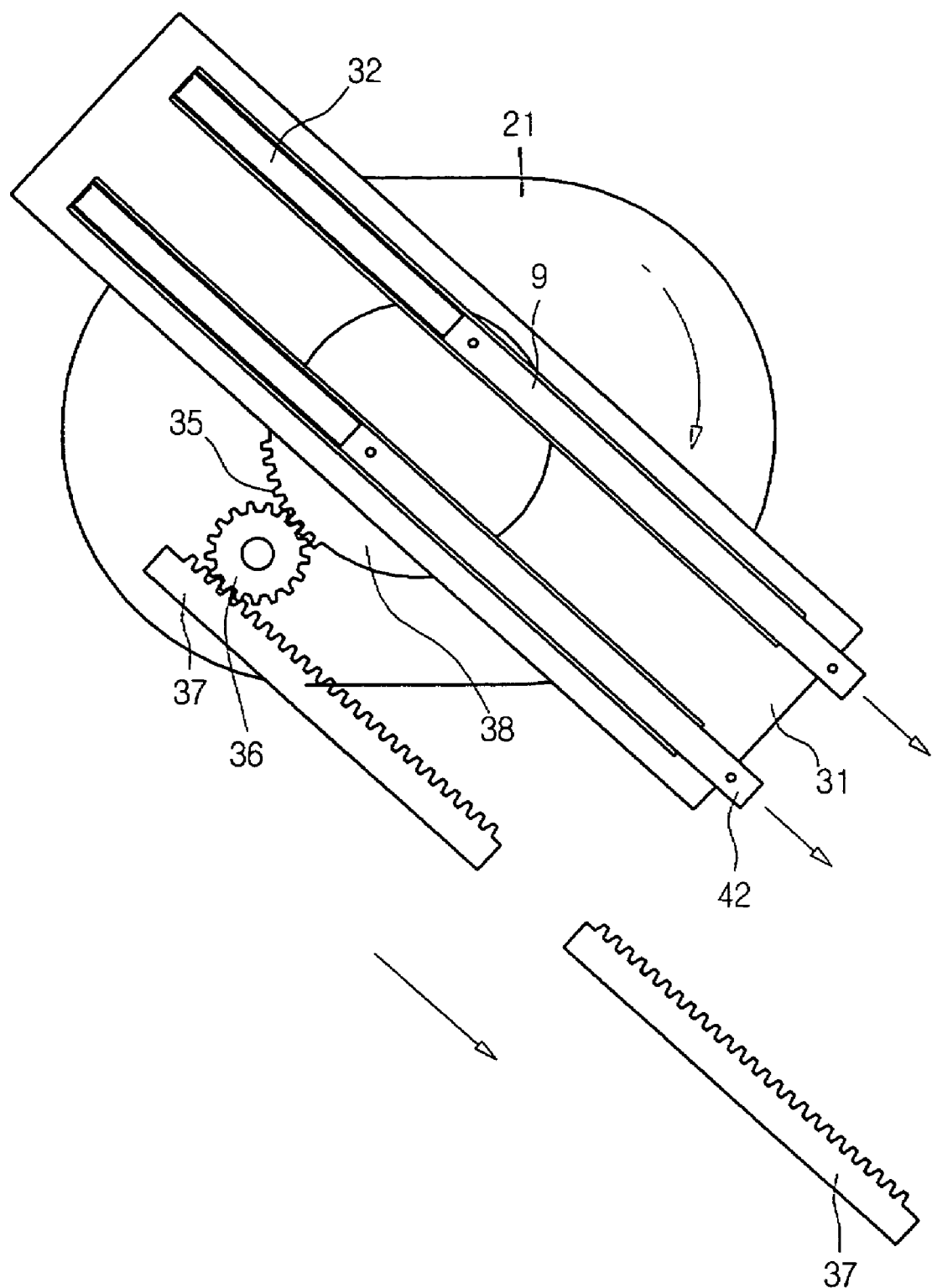
FIG. 12 is a plan view showing a display device that is in the midst of lateral translation, according to the second embodiment of the present invention.

FIG. 10 is a plan view showing a display device that has not been pivoted, according to the second embodiment of the present invention, FIG. 11 is a plan view showing a display device that has been pivoted and in a position beginning lateral translation, according to the second embodiment of the present invention, and FIG. 12 is a plan view showing a display device that is in the midst of lateral translation, according to the second embodiment of the present invention.

Referring first to FIG. 10, the cylindrical gear 35 is separated by a predetermined distance to the pinions 36, and the rack 37 is separated by a predetermined distance to the pinions 36. In this condition, when a user pivots the display device 1, the movable unit does not translate laterally with respect to the fixed unit 3.

Here, when the user further pivots the display device, the structure shown in FIG. 11 is attained. Referring to FIG. 11, the cylindrical gear 35 meshes with the pinions 36, and the rack 37 also meshes with the pinions 36. In this way, when the user further pivots the display device to be configured as in FIG. 11, the cylindrical gear 35 and the pinions 36 translate the rack 37 laterally. When the rack 37 is translated, the mounting plate 43 and the movable unit 4 also translate laterally.

Referring to FIG. 12, when the user pivots the display device still further, the rack 37 moves to the right and the display device can be seen rotating in a clockwise direction.

When this occurs, the display device can avoid the restrictions imposed by the rear wall, and can easily be pivoted to a further degree. Moreover, even if a user imparts force in only a rotating direction of the display device, the display device simultaneously translates laterally and pivots, to increase user convenience.

Third Embodiment

According to the second embodiment, a user need only to pivot the display device in a pivoting direction to achieve both pivoting and translation of the display device. However, in order to achieve simultaneous pivoting and translation, considerable force needs to be exerted, so that the product is unsuitable for seniors. Furthermore, over prolonged use of the device, foreign substances may lodge therein and discrepancies in tolerances may arise, causing the above task to be more arduous.

To overcome this problem, a third embodiment is put forth.

Figure 13:
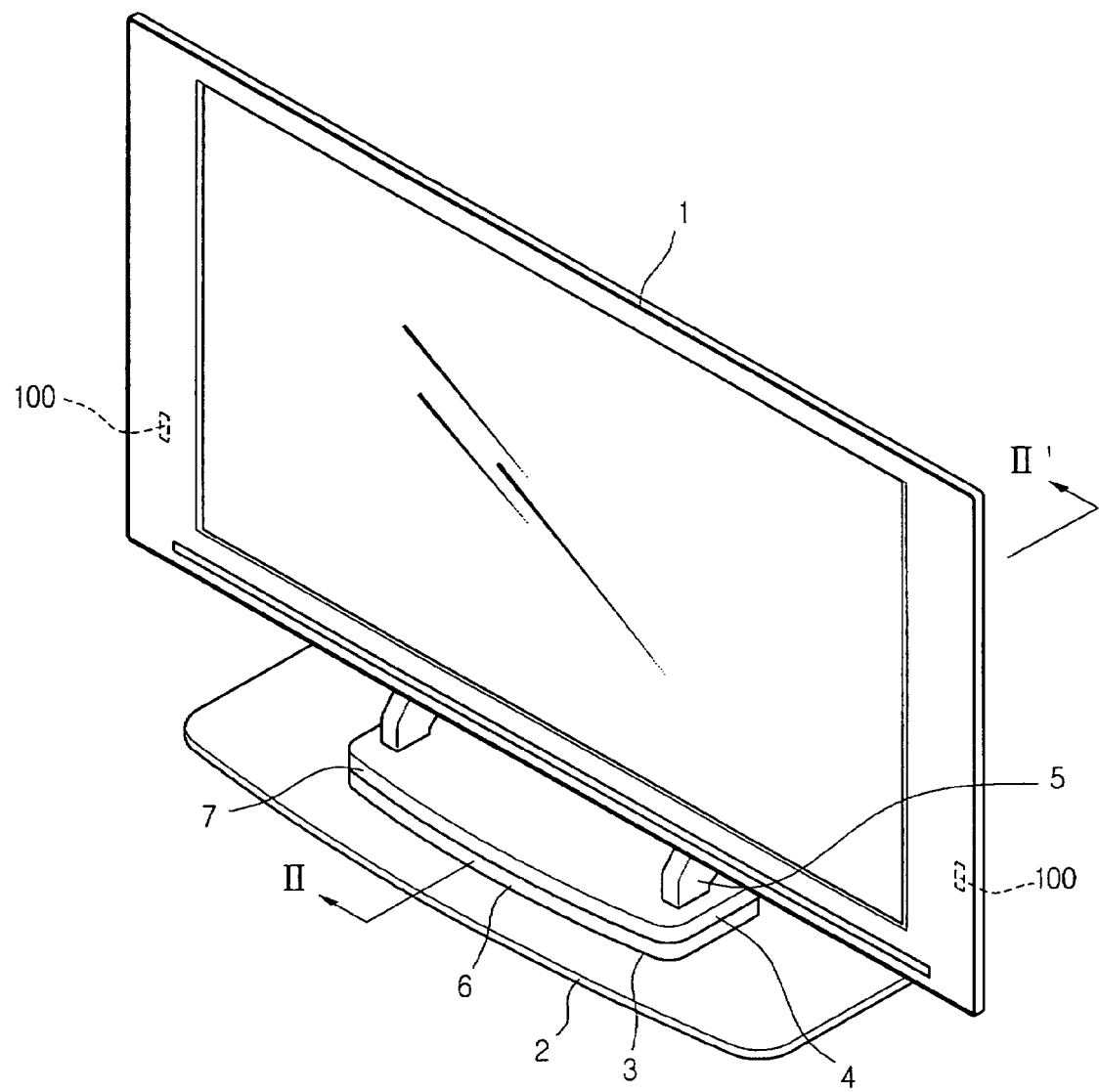
FIG. 13 is a perspective view of a stand according to the third embodiment of the present invention.
Figure 14:
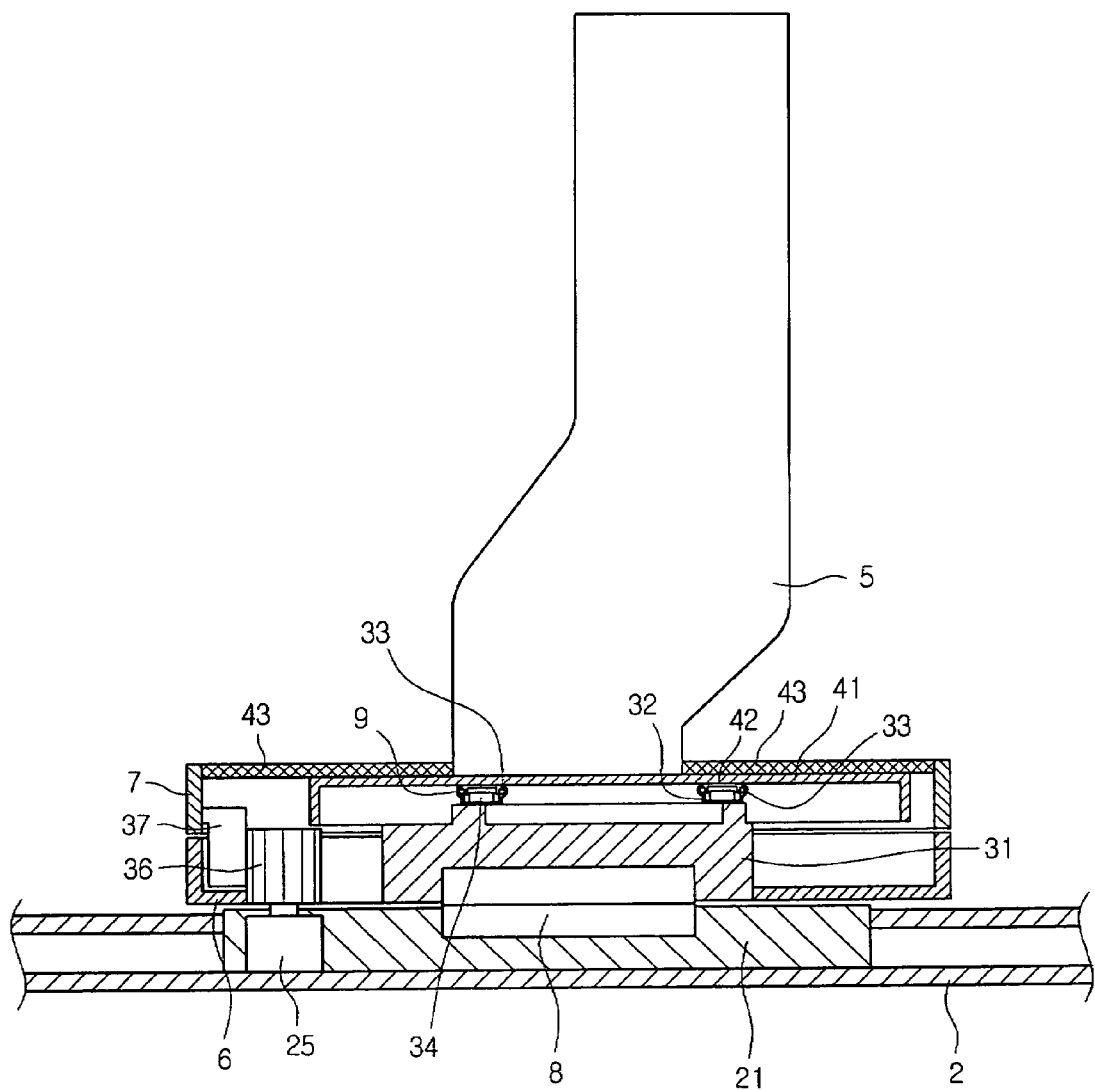
FIG. 14 is a sectional view of the stand in FIG. 13 taken along line II-II'.

FIG. 13 is a perspective view of a stand according to the third embodiment of the present invention, and FIG. 14 is a sectional view of the stand in FIG. 13 taken along line II-II'. In the description of the third embodiment, components that have already been described in the first and second embodiments and have the same reference numbers will be deemed described herein.

Referring to FIG. 13, a position sensor 100 is further installed on the rear surface at either side of the display device 1. The position sensor 100 is a proximity or contact sensor that senses when the rear of the display device 1 is close to touching a wall when the display device pivots toward the wall.

Thus, the position sensor 100 senses when the display device has pivoted to its maximum limit, and transmits the data to a control unit that automatically activates the moving unit 4 in a lateral translating direction.

FIG. 14 shows a mechanism for automatically actuating the movable member.

Referring to FIG. 14, the pinion 36 is connected to a shaft of a motor 25. When the detecting unit 100 detects that the display device 1 comes into contact with a wall, the controller of the display device 1 controls the motor 25 to drive the pinion 36. It will be easily understood that the pinion 36 is driven by the motor 25 in engagement with the rack 37.

When the pinion 36 is driven automatically by the motor 25, the rack 37 engaged with the pinion is moved such that the whole movable unit 4 can be translated right or left. It is not required for a user to push the display device 1 to translate the display device 1. The display device 1 can be translated by only rotating the display device 1 to engage the pinion 36 with the rack 7. Then, the display device 1 is automatically translated by the driving force of the motor 25 transmitted through the pinion 36 and the rack 37.

In the current embodiment, a user can rotate or translate the display device 1 conveniently using minimal force.

In addition to the embodiments thus outlined, various similar embodiments can equally be applied to the present invention. For example, other embodiments in which the display device can be laterally translated by pivoting it, without necessarily using the rack and pinion, may be deemed included in the present invention. The present invention has the ability to sense when the display device is about to collide with a wall during its pivoting, and automatically translate the display device laterally to create a wider range of rotation.

Also, the swivel hinge and the telescopic unit may be relocated—for example, the telescopic unit may be provided below the swivel hinge.

Additionally, in the third embodiment according to the present invention, a separately installed position sensor is not required in the display device to automatically translate the display device laterally. This can be done by the user pressing a button to activate the drive motor.

Furthermore, the stand for a display device according to the present invention can maximally use the pivoting range to the left and right of the swivel hinge of the display device.

Also, by allowing the display device to be translated laterally through pivoting it, the viewing angle of the display device can be increased.

In addition, because a user can easily pivot the display device to the left and right, the device is suitable for seniors. Even after long periods of use, the device will not develop operational faults.

It will be apparent to those skilled in the art that various modifications and variations can be made in the present invention. Thus, it is intended that the present invention covers the modifications and variations of this invention provided they come within the scope of the appended claims and their equivalents.

What is claimed is:

1. A stand for a display device, comprising:
   a base;
   a swivel hinge fixed to the base;
   a fixed unit rotatably coupled to the swivel hinge;
   a telescopic unit including one member fixed to the fixed unit; and
   a movable unit to which another member of the telescopic unit is fixed, the movable unit being capable of being translated in left and right directions of the base and being rotated,
   wherein the movable unit is automatically translated in the left or right direction corresponding to a rotation of the fixed unit with respect to the base, and
   wherein the fixed unit comprises:
      a cylindrical gear configured to be rotated along with a rotation of the fixed unit;
      a pinion supported by the base and selectively engaged with the cylindrical gear; and
      a rack fixed to the fixed unit and selectively engaged with the pinion.

2. The stand according to claim 1, wherein the telescopic unit comprises a friction member therein such that the telescopic unit is operated when a force larger than a predetermined strength is applied.

3. The stand according to claim 1, wherein a plurality of telescopic units is disposed in parallel with each other.

4. The stand according to claim 1, wherein the fixed unit rotates to the same angle as the movable unit.

5. The stand according to claim 1, wherein the movable unit is capable of being translated in left and right directions of the display device.

6. The stand according to claim 1, wherein the cylindrical gear, the pinion, and the rack are engaged with each other when the fixed unit is rotated by at least a predetermined angle.

7. The stand according to claim 1, wherein when the display device is rotated a predetermined angle, the movable unit is translated by a moment applied to the display device by a user for rotating the display device.

8. The stand according to claim 1, further comprising:
   a motor fixed to the base;
   the pinion coupled to a shaft of the motor.

9. The stand according to claim 8, further comprising a sensing unit formed on a rear side of the display device for sensing an approach of the display device to a wall.

10. The stand according to claim 1, wherein the display device is automatically translated in left and right directions when the display device is rotated to a predetermined angle.

11. A stand for a display device, comprising:
    a base to which the display device is fixed;
    a swivel hinge provided between the base and the display device, for allowing rotation of the display device with respect to the base; and
    a telescopic unit provided between the base and the display device, for allowing translation of the display device in one direction with respect to the base, the telescopic unit comprising a lower member and an upper member, the upper member slidably coupled to the lower member;
    a cylindrical gear configured to be rotated along with a rotation of the swivel hinge;
    a pinion supported by the base and selectively engaged with the cylindrical gear; and
    a rack configured to be coupled to the upper member and selectively engaged with the pinion,
    wherein one side of the swivel hinge is fixed to the base, and a translating motion of the display device with respect to the base is performed by a force converted from a moment that rotates the display device with respect to the base.

12. The stand according to claim 11, wherein the swivel hinge allows the rotation of the display device, and then the telescopic unit allows the translation of the display device.

13. The stand according to claim 11, wherein the display device is translated by a driving force of a motor.

14. The stand according to claim 13, wherein the motor is operated when the display device approaches a rear wall.

15. A stand of a display device, comprising:
a base;
a swivel hinge having a lower portion fixed to the base;
a fixed plate fixed to an upper portion of the swivel hinge for rotation;
a telescopic unit having one member fixed to an upper portion of the fixed plate;
a sliding plate to which another member of the telescopic unit is fixed and capable of translation with respect to the fixed plate; and
a support fixed to an upper portion of the sliding plate for supporting the display device,
a cylindrical gear configured to be rotated along with a rotation of the fixed plate;
a pinion supported by the base and selectively engaged with the cylindrical gear; and
a rack configured to be coupled to the sliding plate and selectively engaged with the pinion,
wherein the fixed plate and the sliding plate are rotatable with respect to the base in one rotation axis, and a translation motion of the sliding plate with respect to the fixed plate is synchronized with a rotation of the fixed plate with respect to the base.

16. The stand according to claim 15, wherein the telescopic unit is operated when a rear surface of the display device comes into contact with a rear wall.

17. The stand according to claim 15, wherein the telescopic unit is operated by a moment applied to the display device.

18. The stand according to claim 15, wherein the telescopic unit is operated by a driving force of a motor.

19. The stand according to claim 1, wherein the swivel hinge provides a rotation motion to the fixed unit with respect to the base, and the telescopic unit provides a translating motion to the movable unit with respect to the fixed unit.

20. The stand according to claim 1, wherein the swivel hinge is disposed between the base and the fixed unit, and the telescopic disposed between the fixed unit and the movable unit, and swivel hinge provides one rotation axis to the fixed unit and the movable unit with respect to the base.

* * * * *